(12) United States Patent
Marastoni

(10) Patent No.: US 10,822,218 B2
(45) Date of Patent: Nov. 3, 2020

(54) STORAGE SYSTEM FOR STORING OBJECTS OF PLASTIC MATERIAL PROCESSED IN A BOTTLING LINE

(71) Applicant: SACMI COOPERATIVA MECCANICI IMOLA SOCIETA' COOPERATIVA, Imola (Bologna) (IT)

(72) Inventor: Daniele Marastoni, San Giovanni in Persiceto (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 139 days.

(21) Appl. No.: 16/219,113

(22) Filed: Dec. 13, 2018

(65) Prior Publication Data

US 2019/0112173 A1    Apr. 18, 2019

Related U.S. Application Data

(63) Continuation of application No. 15/599,242, filed on May 18, 2017, now Pat. No. 1,096,211, which is a
(Continued)

(30) Foreign Application Priority Data

Dec. 3, 2012    (WO) .................. PCT/IB2012/056922

(51) Int. Cl.
*B67C 7/00* (2006.01)
*B29C 49/42* (2006.01)
(Continued)

(52) U.S. Cl.
CPC ............ *B67C 7/0073* (2013.01); *B29C 49/06* (2013.01); *B29C 49/4205* (2013.01);
(Continued)

(58) Field of Classification Search
CPC combination set(s) only.
See application file for complete search history.

(56) References Cited

U.S. PATENT DOCUMENTS

| | | |
|---|---|---|
| 3,220,596 A | 11/1965 | Martin |
| 3,246,790 A | 4/1966 | Martin |

(Continued)

FOREIGN PATENT DOCUMENTS

| | | |
|---|---|---|
| DE | 3232039 | 3/1983 |
| DE | 10050660 A1 | 4/2002 |

(Continued)

*Primary Examiner* — Kyle O Logan
(74) *Attorney, Agent, or Firm* — Pearne & Gordon LLP

(57) ABSTRACT

A storage system for storing objects of plastic material processed in a bottling line (45) comprises: a plurality of drawers (4) configured to contain groups of objects (5); a frame (2) which defines a plurality of compartments (3) configured to house the drawers (4); a conveyor (8) movable in the storage system (1) itself and configured to access the compartments (3) in such a way as to withdraw and place drawers (4) from and into the compartments (4); a loading bay (11) having one or more loading compartments for receiving corresponding drawers (4) and having a loading manipulator (28) configured to place in the drawers (4) the loose objects (5) received from an infeed conveyor (29); an unloading bay (12) having at least one unloading compartment for receiving a corresponding drawer (4) and having an unloading manipulator (41) configured to place onto an outfeed conveyor (43, 44) the loose objects (5) stored in the drawer (4).

19 Claims, 11 Drawing Sheets

Related U.S. Application Data continuation of application No. 14/649,135, filed as application No. PCT/IB2013/054512 on May 31, 2013, now Pat. No. 9,790,027.

(51) Int. Cl.

| | | |
|---|---|---|
| *B29C 49/06* | (2006.01) | |
| *B29C 49/46* | (2006.01) | |
| *B29C 49/64* | (2006.01) | |
| *B65B 3/02* | (2006.01) | |
| *B65B 3/04* | (2006.01) | |
| *B65B 7/28* | (2006.01) | |
| *B65G 1/06* | (2006.01) | |
| *B65G 37/00* | (2006.01) | |
| *B65G 47/00* | (2006.01) | |
| *B65G 65/00* | (2006.01) | |
| *B65G 65/23* | (2006.01) | |
| *B29K 105/00* | (2006.01) | |
| *B67C 3/22* | (2006.01) | |
| *B29L 31/00* | (2006.01) | |
| *B29L 31/56* | (2006.01) | |
| *B29C 49/36* | (2006.01) | |
| *B29C 49/68* | (2006.01) | |
| *B29C 49/02* | (2006.01) | |

(52) U.S. Cl.
CPC .......... *B29C 49/4273* (2013.01); *B29C 49/46* (2013.01); *B29C 49/6418* (2013.01); *B65B 3/022* (2013.01); *B65B 3/04* (2013.01); *B65B 7/28* (2013.01); *B65G 1/06* (2013.01); *B65G 37/00* (2013.01); *B65G 47/00* (2013.01); *B65G 65/00* (2013.01); *B65G 65/23* (2013.01); *B67C 7/002* (2013.01); *B29C 49/36* (2013.01); *B29C 49/6427* (2013.01); *B29C 49/68* (2013.01); *B29C 2049/028* (2013.01); *B29C 2049/4697* (2013.01); *B29K 2105/258* (2013.01); *B29L 2031/565* (2013.01); *B29L 2031/7158* (2013.01); *B67C 2003/227* (2013.01); *B67C 2003/228* (2013.01)

(56) References Cited

U.S. PATENT DOCUMENTS

| | | | |
|---|---|---|---|
| 4,104,807 A | | 8/1978 | Braun |
| 4,468,165 A | | 8/1984 | Kawasaki |
| 4,597,242 A | | 7/1986 | Hendriks et al. |
| 5,059,079 A | * | 10/1991 | Foulke .............. H01L 21/67769 294/907 |
| 5,409,545 A | * | 4/1995 | Levey .................... B08B 9/205 134/129 |
| 5,428,304 A | | 6/1995 | Landers et al. |
| 5,702,734 A | | 12/1997 | Hartman et al. |
| 5,953,234 A | | 9/1999 | Singer et al. |
| 5,996,322 A | | 12/1999 | La Barre |
| 6,119,433 A | | 9/2000 | Kitahora et al. |
| 6,185,910 B1 | | 2/2001 | Achhammer |
| 6,189,292 B1 | | 2/2001 | Odell et al. |
| 6,230,472 B1 | | 5/2001 | Stahlecker |
| 6,341,469 B1 | | 1/2002 | Derouault et al. |
| 6,428,304 B1 | * | 8/2002 | Sartor ................ B29C 45/0416 264/537 |
| 6,688,839 B1 | | 2/2004 | Hirschek et al. |
| 7,097,045 B2 | | 8/2006 | Winkler |
| 7,717,774 B2 | | 5/2010 | Rothbauer et al. |
| 7,900,422 B2 | | 3/2011 | Fischer |
| 8,505,269 B2 | | 8/2013 | Kobayashi et al. |
| 8,506,869 B2 | * | 8/2013 | Lappe ................. B29C 49/6409 264/454 |
| 8,556,620 B2 | | 10/2013 | Parrinello et al. |
| 8,632,325 B2 | | 1/2014 | Voth et al. |
| 8,677,723 B2 | | 3/2014 | Bottger et al. |
| 9,004,905 B2 | | 4/2015 | Humele et al. |
| 9,028,739 B2 | | 5/2015 | Parrinello et al. |
| 9,061,873 B2 | | 6/2015 | Humele |
| 9,296,148 B2 | | 3/2016 | Feuilloley |
| 9,321,621 B2 | | 4/2016 | Kitano et al. |
| 9,415,429 B2 | * | 8/2016 | Benedetti ............... B08B 3/041 |
| 9,446,550 B2 | | 9/2016 | Parrinello et al. |
| 2003/0083769 A1 | * | 5/2003 | Yamazaki ......... H01L 21/67276 700/116 |
| 2003/0147738 A1 | * | 8/2003 | Hanel ..................... B65G 1/02 414/807 |
| 2004/0187444 A1 | | 9/2004 | Hutchinson et al. |
| 2004/0193311 A1 | * | 9/2004 | Winkler ............... B65G 1/1378 700/216 |
| 2005/0097863 A1 | | 5/2005 | Taggart |
| 2005/0217211 A1 | | 10/2005 | Py |
| 2005/0223677 A1 | | 10/2005 | Py |
| 2005/0230639 A1 | * | 10/2005 | Ancona .................... A61L 2/10 250/455.11 |
| 2006/0111812 A1 | * | 5/2006 | Okamoto ............. G05D 1/0251 700/214 |
| 2007/0220835 A1 | | 9/2007 | Till |
| 2008/0017045 A1 | | 1/2008 | McGuire |
| 2008/0029481 A1 | | 2/2008 | Kothari et al. |
| 2008/0042325 A1 | | 2/2008 | Imatani et al. |
| 2008/0118335 A1 | * | 5/2008 | Ishida ................. B65G 1/1371 414/280 |
| 2008/0166442 A1 | | 7/2008 | Balboni et al. |
| 2008/0296820 A1 | * | 12/2008 | Bambi .................. B66C 1/0287 269/21 |
| 2009/0071104 A1 | | 3/2009 | Fischer |
| 2009/0077933 A1 | | 3/2009 | Backhaus et al. |
| 2009/0127076 A1 | | 5/2009 | Balboni et al. |
| 2009/0186571 A1 | | 7/2009 | Haro |
| 2009/0211713 A1 | | 8/2009 | Binacchi |
| 2009/0223175 A1 | | 9/2009 | Monzel |
| 2010/0090375 A1 | * | 4/2010 | Geltinger ............... B29C 49/783 264/529 |
| 2010/0127435 A1 | | 5/2010 | Feuilloley |
| 2010/0133729 A1 | | 6/2010 | Shah |
| 2010/0205903 A1 | | 8/2010 | Py |
| 2010/0256248 A1 | | 10/2010 | Salmang et al. |
| 2011/0056172 A1 | | 3/2011 | Klenk et al. |
| 2011/0070059 A1 | * | 3/2011 | Savoia ................. B65G 47/252 414/758 |
| 2011/0094616 A1 | | 4/2011 | Hayakawa et al. |
| 2011/0109018 A1 | | 5/2011 | Parrinello et al. |
| 2011/0133370 A1 | * | 6/2011 | Engelhard ............... B29C 49/42 264/535 |
| 2011/0138594 A1 | * | 6/2011 | Borgatti ................. B29C 49/36 29/401.1 |
| 2011/0146202 A1 | | 6/2011 | Imatani et al. |
| 2011/0147194 A1 | | 6/2011 | Kamen et al. |
| 2011/0154785 A1 | * | 6/2011 | Stolte ..................... B29C 49/64 53/452 |
| 2011/0206494 A1 | * | 8/2011 | Lockie .................... B65G 59/02 414/802 |
| 2011/0219728 A1 | * | 9/2011 | Humele ................. B67B 3/003 53/452 |
| 2011/0260372 A1 | | 10/2011 | Hahn |
| 2011/0291332 A1 | | 12/2011 | Voth et al. |
| 2012/0045302 A1 | * | 2/2012 | Iizuka ................. H01L 21/67393 414/287 |
| 2012/0070522 A1 | | 3/2012 | Voth et al. |
| 2012/0085071 A1 | | 4/2012 | Hahn et al. |
| 2012/0100238 A1 | | 4/2012 | Humele et al. |
| 2012/0101627 A1 | * | 4/2012 | Lert ..................... B65G 1/0492 700/216 |
| 2012/0160637 A1 | * | 6/2012 | Itoh ......................... B65G 13/06 198/784 |
| 2012/0222801 A1 | | 9/2012 | Pedercini et al. |
| 2012/0286459 A1 | | 11/2012 | Neubauer et al. |
| 2013/0061557 A1 | | 3/2013 | Kitano et al. |
| 2013/0115325 A1 | * | 5/2013 | Matteo .................... B29C 48/09 425/533 |
| 2013/0328248 A1 | | 12/2013 | Herold et al. |
| 2014/0027956 A1 | | 1/2014 | Parrinello et al. |

(56) References Cited

U.S. PATENT DOCUMENTS

| | | | |
|---|---|---|---|
| 2014/0157726 A1* | 6/2014 | Clusserath | B65B 3/022 53/452 |
| 2014/0318083 A1 | 10/2014 | Marastoni | |
| 2014/0338291 A1 | 11/2014 | Parrinello et al. | |
| 2015/0274498 A1 | 10/2015 | Van Steen et al. | |
| 2015/0298906 A1 | 10/2015 | Marastoni | |

FOREIGN PATENT DOCUMENTS

| | | |
|---|---|---|
| DE | 102008057403 | 5/2010 |
| EP | 1462393 A1 | 9/2004 |
| EP | 1462393 B1 | 8/2006 |
| EP | 2388129 | 11/2011 |
| EP | 2447038 | 5/2012 |
| EP | 2578504 | 4/2013 |
| GB | 1039511 | 8/1966 |
| IT | 01359024 A | 3/2007 |
| JP | S6048802 | 3/1985 |
| JP | 2003081441 | 3/2003 |
| JP | 2005280880 | 10/2005 |
| JP | 2007106438 | 4/2007 |
| JP | 2010524742 | 7/2010 |
| WO | 9955604 | 11/1999 |
| WO | 2006/092651 A1 | 9/2006 |
| WO | 2008/090207 | 7/2008 |
| WO | 2008132603 | 11/2008 |
| WO | 2009/127962 A2 | 10/2009 |
| WO | 2011148953 | 12/2011 |

\* cited by examiner

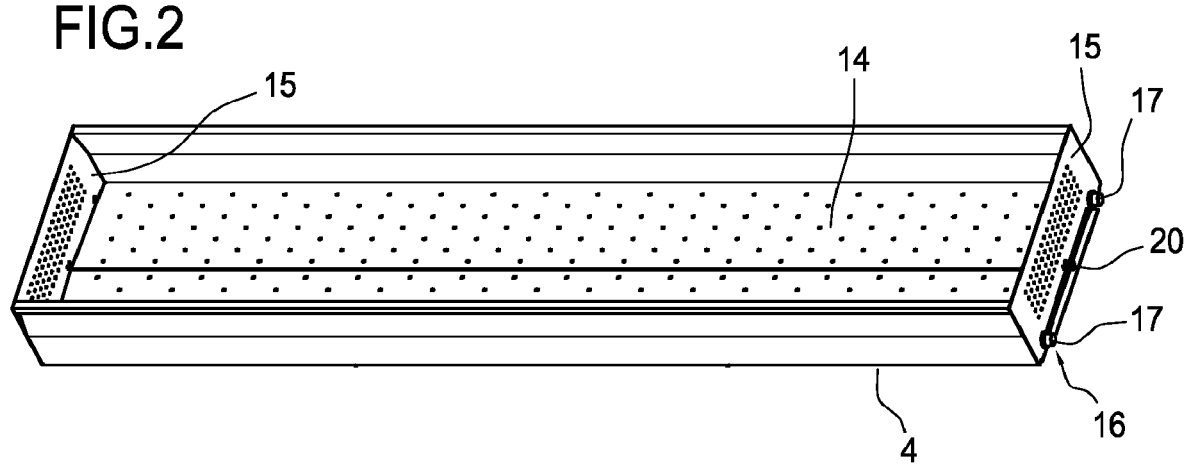
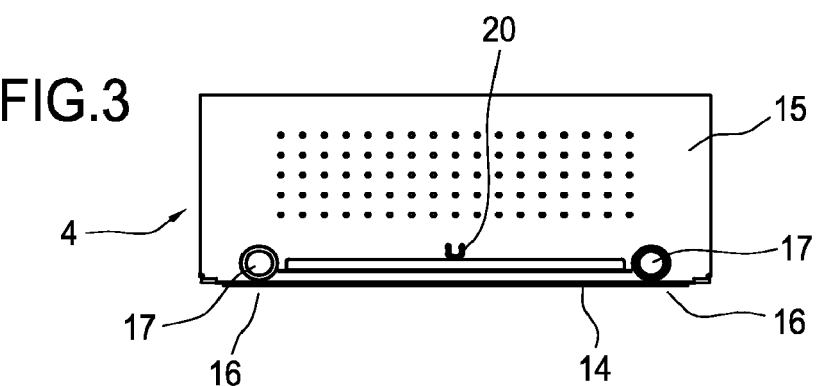
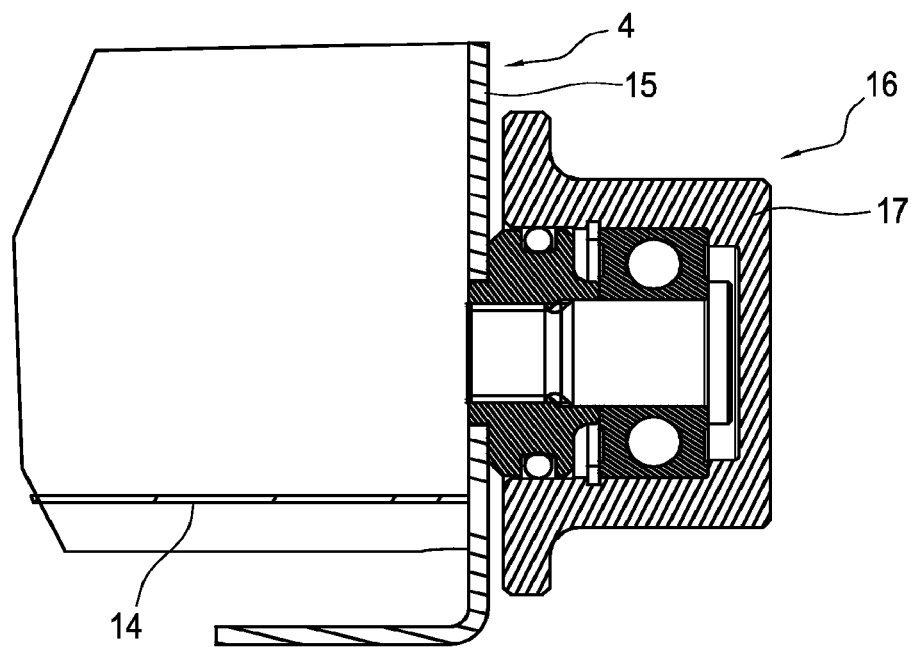

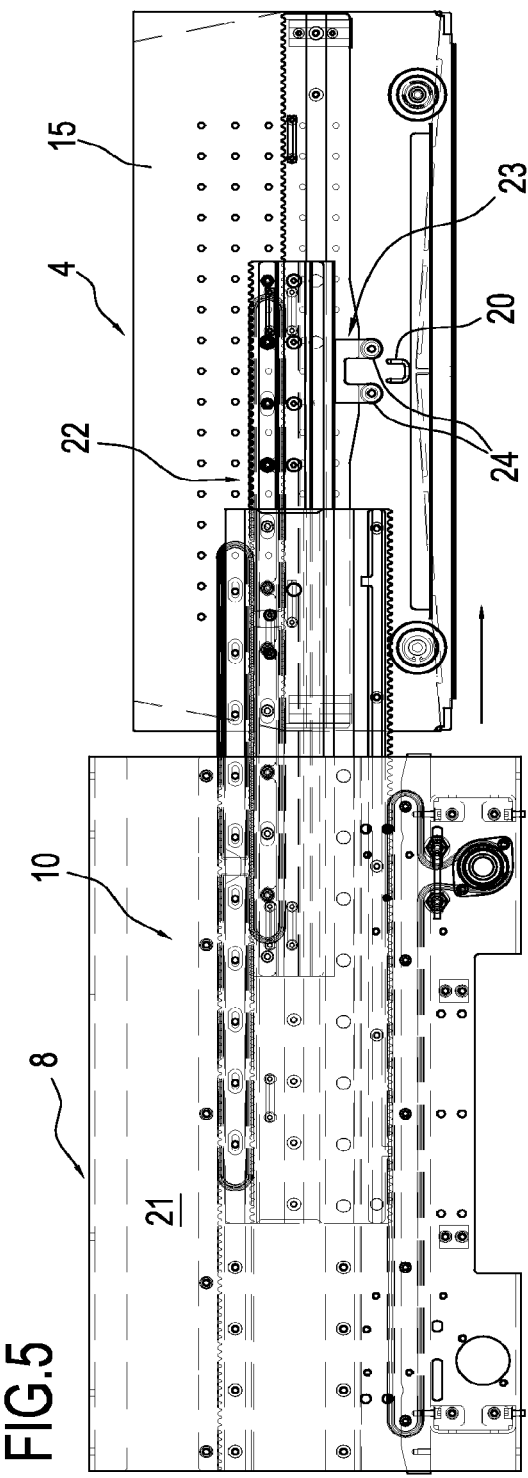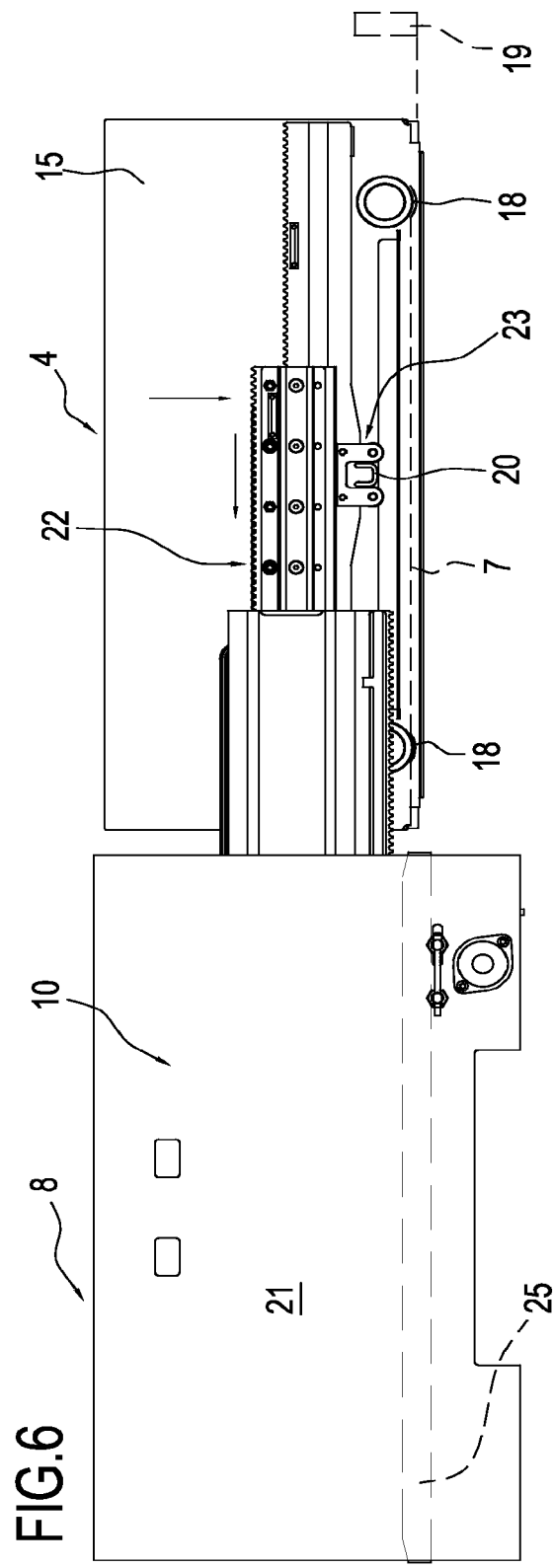

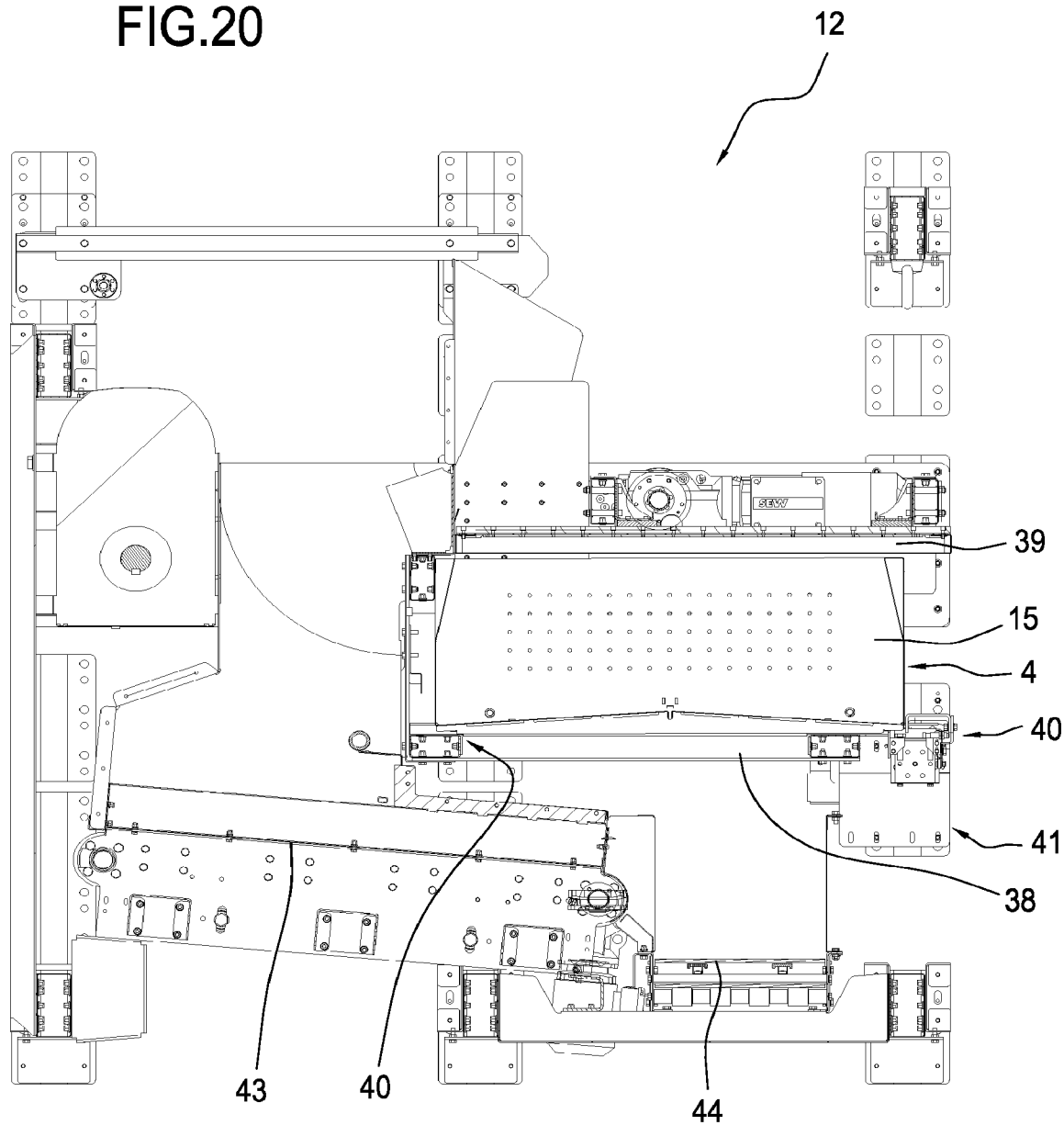

STORAGE SYSTEM FOR STORING OBJECTS OF PLASTIC MATERIAL PROCESSED IN A BOTTLING LINE

TECHNICAL FIELD

This invention relates to a storage system for storing objects of plastic material processed in a bottling line.

This invention also relates to a bottling line (and more specifically, a continuous cycle line for bottling containers of thermoplastic material) equipped with a storage system.

BACKGROUND ART

In the field of bottling lines for filling containers of thermoplastic material, patent document WO2009/127962 (in the name of the same Applicant as this invention) describes a bottling line equipped with a storage system for the parisons.

The purpose of this storage system is to create a buffer in which the parisons can accumulate, so as to avoid having to interrupt the operation of a rotary compression moulding machine for making parisons (and which has a high productive inertia) in the event of shutdown of the blow-moulding unit.

This storage system, however, does not allow rational and efficient management of the objects contained therein, with a view to complete and systematic integration of the storage system in the operation of the line.

Moreover, this storage system does not guarantee a high level of hygiene for the objects it contains.

DISCLOSURE OF THE INVENTION

This invention has for an aim to provide a storage system for storing objects of plastic material processed in a bottling line and which overcomes the above mentioned disadvantages of the prior art.

More specifically, the aim of this invention is to provide a storage system for storing objects of plastic material processed in a bottling line and which allows efficient management that can be coordinated stably with the operation of the bottling line.

A further aim of the invention is to provide a storage system for storing objects of plastic material processed in a bottling line and which allows a high level of hygiene to be achieved.

These aims are fully achieved by the storage system and by the method according to the invention as characterized in the appended claims.

According to the invention, the storage system for storing objects of plastic material processed in a bottling line comprises a plurality of drawers configured to contain groups of these objects.

The storage system comprises a frame which defines a plurality of compartments configured to house the drawers.

The storage system comprises a conveyor movable in the storage system itself and configured to access the compartments in such a way as to withdraw and place drawers from and into the compartments.

The storage system comprises a loading bay having one or more loading compartments for receiving corresponding drawers and having a loading manipulator configured to place in the drawers the loose objects received from an infeed conveyor.

The storage system comprises an unloading bay having at least one unloading compartment for receiving a corresponding drawer and having an unloading manipulator configured to place onto an outfeed conveyor the loose objects stored in the drawer.

Preferably, the compartments for housing the drawers are positioned inside a space defined by the frame, or modular framework, of the storage system.

Preferably, the conveyor is constrained to move the drawers within the space defined by the modular framework.

Preferably, the storage system comprises one or more sensors configured to count and/or weigh the objects contained in the drawers (for example, counting units).

Preferably, the storage system also comprises a control unit set up to receive a drive signal representing the operation of the bottling line and connected to the conveyor and to the loading and unloading manipulators to control their movements automatically as a function of the drive signal and the data collected by the sensors.

Preferably, the loading manipulators comprise controlled feed elements and the unloading manipulators comprise means for rotating the drawer about a longitudinal axis of the drawer itself.

Preferably, the control unit comprises a memory containing a database and is programmed to automatically store in the database information regarding the contents of the drawers in relation to the compartment in which each drawer is positioned.

Preferably, the control unit is programmed to drive the conveyor based on a FIFO method of storing and retrieving the objects.

Preferably, the control unit comprises a memory containing a database and is programmed to set control codes representing a sequence of actions of the loading bay and/or unloading bay as a function of a value selected by a user from a plurality of values displayed by the control unit for a parameter representing the types of objects which the storage system contains or is to contain.

Preferably, the unloading bay comprises a bottom outfeed conveyor belt oriented along a longitudinal direction; and an actuator (or rotation means) operating on the drawer which is positioned in the unloading compartment or frame to rotate it about a longitudinal axis of rotation in order to place the objects by gravity on the bottom conveyor belt.

Preferably, the unloading bay comprises a panel which is movable uninterruptedly between a first operating position where the drawer is closed by the panel and a second operating position where the drawer is open.

The movement of the panel is coordinated with the rotation of the drawer. Preferably, the unloading bay comprises a chute which guides the objects as they fall and whose inclination angle is adjustable to guide the objects as they fall onto the receiving conveyor belt below. Preferably, the bottom conveyor has an operating section which is inclined downwardly (that is, towards the floor).

Preferably, the bottom collecting conveyor takes the loose objects to a further, removing conveyor belt which conveys the objects from the storage system to the bottling line.

Preferably, the unloading bay comprises a first outfeed conveyor belt oriented along a longitudinal direction and set up to receive objects from the outside of the storage system and to convey them along the longitudinal direction.

The loading bay also comprises a pushing element or diverting belt which is movable in a direction having at least one component transversal to the longitudinal direction and which acts in conjunction with the first outfeed conveyor belt to push the objects out from one side of the belt.

The loading bay further comprises one or more loading compartments, defined by a load-bearing frame and positioned laterally of the belt at a level below the belt.

The loading bay comprises at least two loading compartments offset along the transversal direction and located at different heights so as to house two drawers simultaneously in the loading bay.

The loading bay comprises an orienting element (for example, a first chute) which is movable between two operating positions to selectively direct the objects falling from the conveyor belt towards one or the other of the drawers positioned in the loading compartments.

The diverting belt is also movable along the longitudinal direction and the loading compartment or compartments are configured to move the drawer relative to the first belt along the transversal direction to allow the pushing element to move, according to a predetermined filling criterion, a zone for dropping off the objects from the conveyor belt into the drawer, within an area defined by the bottom wall of the drawer.

Preferably, each loading compartment comprises a kinematic unit connectable to the corresponding drawer to allow the drawer to move along the transversal direction.

Preferably, the drawers are movable relative to the conveyor and compartments of the storage system by means of rolling elements associated with the drawer.

Preferably, the conveyor also has rolling elements for moving the drawers.

Preferably, the bottom wall of each drawer is inclined and defines openings which allow a liquid to flow out of the drawer spontaneously.

Preferably, the drawers have two opposite side walls or head ends provided with pluralities of holes.

The storage system comprises a drawer washing bay located in one or more compartments and accessible by the conveyor.

Preferably, the control unit is programmed to control the conveyor and the washing bay to wash all the drawers at predetermined time intervals.

Preferably, the washing bay comprises washing means consisting of nozzles configured to spray a hot acid washing liquid onto the inside walls of the drawer.

Preferably, the conveyor is a stacker lift.

The stacker lift comprises a frame which is slidably coupled to the modular framework to translate along a longitudinal direction parallel to the floor within an aisle without compartments inside the storage system.

The stacker lift comprises a lift which is movable vertically relative to its frame and movable independently of, and simultaneously with, the longitudinal translational movement of the selfsame frame.

Preferably, the storage system is a drawer type storage system, that is, it comprises a plurality of drawers.

The storage system has a structure defining a plurality of compartments (or housings) for the drawers. These compartments are arranged in a plurality of juxtaposed columns.

The storage system also comprises (at least) one stacker lift having a platform (or carriage) designed to receive and move the drawers.

The lift platform is movable vertically (varying its height from the storage system floor) and horizontally, in a direction at right angles to the vertical direction.

More specifically, the stacker lift is configured in such a way that the platform is movable adjacently to all the compartments in the storage system in order to withdraw or insert drawers from and into the compartments.

Preferably, the storage system comprises a drawer washing and sanitizing station or bay.

The storage system also comprises at least one loading bay and at least one unloading bay for the objects stored in the storage system.

The loading and unloading bays are accessible by the stacker lift.

The loading and unloading bays are located in zones of the storage system adjacent the conveyors designed to convey the objects into and out of the storage system (respectively) and constituting the connections between the storage system and the other units of the production or bottling line.

The loading and unloading bays are equipped with respective manipulators (automatic handling means) for picking up and moving the objects stored in the storage system.

The lift moves within the storage system (driven by a control unit) between the loading bay, the compartments in the storage system, the unloading bay and the washing bay, in such a way as to carry empty drawers to the loading bay, pick up full drawers from the loading bay, carry full drawers to the unloading bay and pick up empty drawers from the unloading bay and to insert full drawers into the compartment and withdraw empty drawers from the compartments of the storage system.

Preferably, the storage system comprises sterilizing means located in the unloading bay and operating on the objects in transit through the unloading bay (leaving the storage system) in order to sanitize them.

In addition (or alternatively), the storage system preferably comprises sterilizing means located in the loading bay and operating on the objects in transit through the loading bay (entering the storage system) in order to sanitize them.

In the loading bay and/or in the unloading bay, the storage system preferably comprises a system for counting the objects (inserted into or withdrawn from the drawers). This counting system comprises, for example, a video camera connected to a processor.

In the loading bay and/or in the unloading bay, the storage system preferably comprises a system for weighing the objects. This weighing system comprises, for example, a loading cell or other known weighing means.

Thus, the storage system is preferably pressurized (with air under pressure). The storage system is preferably pressurized with ionized air. The storage system may extend horizontally or, preferably, vertically. In the latter case (storage system extending vertically), the infeed and outfeed (of the caps and parisons) into and out of the storage system are preferably located at different heights.

Preferably, the storage system is a drawer type storage system, that is, it comprises a plurality of drawers. The storage system has a structure defining a plurality of housings (or slots) for the drawers. These housing are arranged in a plurality of juxtaposed columns.

The storage system also comprises (at least) one lift having a platform (or carriage) designed to receive and move the drawers. The lift platform is movable vertically (varying its height from the storage system floor) and horizontally, in a longitudinal direction at right angles to the vertical direction. More specifically, the (at least one) lift is configured in such a way that the platform is movable adjacently to all the housings in the storage system in order to withdraw or insert drawers from and into the housings.

Preferably, the storage system comprises a drawer washing station. The storage system preferably also comprises a drawer drying station. The storage system also comprises at least one loading bay and at least one unloading bay for the objects stored therein. The loading and unloading bays are accessible by the lift. The loading and unloading bays are located in zones of the storage system adjacent the conveyors designed to convey the objects into and out of the storage system (respectively) and constituting the connections between the storage system and the other units of the line. The loading and unloading bays are equipped with respective manipulators (automatic handling means) for picking up and moving the objects stored in the storage system. More specifically, the manipulator of the loading bay is configured to pick up objects from at least one of the conveyors and to place them in at least one drawer (empty and waiting to be filled) positioned in the loading bay. The manipulator of the unloading bay is configured to pick up objects from at least one drawer (full and waiting to be emptied) positioned in the loading bay and to place them on at least one of the conveyors. The lift moves within the storage system (driven by the control unit) between the loading bay, the housings in the storage system and the unloading bay, in such a way as to carry empty drawers to the loading, bay, pick up full drawers from the loading bay, carry full drawers to the unloading bay and pick up empty drawers from the unloading bay and to insert full drawers into the housings and withdraw empty drawers from the housings of the storage system.

Preferably, the storage system comprises sterilizing means located in the unloading bay and operating on the objects in transit through the unloading bay (leaving the storage system) in order to sanitize them. In addition (or alternatively), the storage system preferably comprises sterilizing means located in the loading bay and operating on the objects in transit through the loading bay (entering the storage system) in order to sanitize them. Preferably, the interior of the storage system is an aseptic (that is, sterile) environment. In light of this, the storage system comprises sterilizing means for sterilizing the space inside the storage system. These sterilizing means comprise, for example, UV ray sources and nozzles configured to spray a sterilizing fluid.

These sterilizing means may be associated, at least in the loading and unloading bays, in combination or alternatively, with means for limiting electrostatic charges such as, for example, but not necessarily, antistatic bars.

In the loading bay and/or in the unloading bay, the storage system preferably comprises a system for checking and rejecting the objects. This checking and rejection system comprises, for example, an optical detector connected to a processor. In the loading bay and/or in the unloading bay, the storage system preferably comprises a system for counting the objects (inserted into or withdrawn from the drawers). This counting system comprises, for example, a video camera connected to a processor. In the loading bay and/or in the unloading bay, the storage system preferably comprises a system for weighing the objects. This weighing system comprises, for example, a loading cell or other known weighing means.

Preferably, the storage system comprises a system of outlet vents (for example connected to fans) located in a high-pressure zone of the storage system. Preferably, the storage system also comprises a system of inlet vents (for example connected to fans) located in a low-pressure zone of the storage system. The pressure in the low-pressure zone is lower than that in the high-pressure zone but preferably higher than the pressure outside the storage system (outside the bottling line). Preferably, the high- and low-pressure zones of the storage system are located at opposite ends of the storage system, so as to create a (laminar) flow of air through the entire space inside the storage system.

Preferably, the drawers are provided with holes to allow an air flow to pass through them. Preferably, the storage system structure defining the drawer housings is a structure (for example, a lattice frame) defining openings through which an air flow can pass.

Preferably, the storage system has the shape of a parallelepiped.

Preferably the storage system has a rectangular base, with two long sides and two short sides. The storage system accordingly has a lateral wall with two large faces and two small faces. Preferably, the high- and low-pressure zones are located at opposite faces of the lateral wall of the storage system, preferably the small faces of the lateral wall.

Preferably, the storage system comprises a plurality of filters coupled to the outlet vents (downstream of the corresponding pressure fans) to filter the air delivered into the storage system.

Preferably, the lift is movable within the storage system along rails which follow a predetermined path. Preferably, the lift is coupled to the rails by rolling elements. This reduces the formation of dust or other material in suspension inside the storage system. As regards the arrangement of the rails, that is to say, of the path followed by the lift in the storage system, attention is drawn to the following. Preferably, the lift carriage is movable vertically, preferably for the full height of the storage system (that is, its vertical stroke is equal to the height of the storage system).

Also, preferably, the lift carriage is movable horizontally, preferably along the direction of the long sides of the storage system base (that is, its horizontal stroke is equal in length to the long sides of the rectangular base of the storage system). In light of this, there are different embodiments.

In a first embodiment, the storage system includes an empty passage which cuts the small lateral faces and separates the storage system into two parts along a dividing plane parallel to the large lateral faces. The lift comprises a frame having, for example, two vertical uprights (whose length is equal to the height of the storage system) which define vertical guide rails for opposite ends of the carriage (which is a substantially rectangular platform). The frame is in turn movable horizontally along a (horizontal,) direction parallel to the large faces. The frame runs on horizontal rails or on a single horizontal rail extending along the dividing plane. In this case, the carriage and the drawers are positioned perpendicularly to the planes defined by the small lateral faces of the storage system.

In a second embodiment, the carriage and the drawers are positioned parallel to the planes defined by the small lateral faces of the storage system. The storage system includes at least one empty passage (vertical aisle) which cuts the large lateral faces and separates the storage system into two or more parts along a dividing plane parallel to the small lateral faces. For example, the storage system might have a plurality of empty passages (vertical aisles) which cut the large lateral faces and separate the storage system into a plurality of parts along dividing planes parallel to the small lateral faces. The storage system also comprises slideways for the lift carriage extending horizontally inside the storage system, to allow the lift carriage to move horizontally inside the storage system. For example, at one or more predetermined levels (that is, at one or more predetermined heights from the storage system floor) there might be slideways for the lift carriage extending horizontally for the full length of the storage system (measured along the long sides of the rectangular base of the storage system). Preferably, the horizontal slideways are located at the lowest level or at the highest level (or at an intermediate level, that is, half way up the storage system). Each of the vertical aisles (positioned transversely to the large lateral faces) has vertical slideways to allow the carriage to move vertically up and down these aisles. When the carriage is aligned with the horizontal slideways, it is able to move horizontally from one vertical aisle to another. It should be noted that the structure of the storage system might also by divided into a plurality of blocks (or modules) movable relative to each other to open and close the free passages between one block and another. These passages define vertical and/or horizontal aisles to move the lift (that is, the lift carriage) within the storage system. In this situation, therefore, the at least one vertical and/or horizontal aisle is created dynamically by moving the blocks. Moreover, they may be formed (opened and closed) anywhere in the storage system. Thanks to this structure, the difference between the total volume of the space inside the storage system and the volume of the space occupied by the drawers inside the storage system is limited to the volume of a single horizontal aisle and a single vertical aisle. This maximizes the space inside the storage system, reducing its overall dimensions (relative to the number of drawers, that is, product storage space). In light of this, the storage system drawers are organized in vertical stacks. The stacks are slidably coupled to a storage system base so that they can be moved horizontally. Drive means (for example, electric motors or other actuators) for the blocks are connected to a control unit (for example, an electronic card) designed to control and manage the storage system. The control unit is set up to receive as input a signal representing the position of the lift carriage and the position (of the housing, that is, the drawer) inside the storage system which the carriage must reach. The control unit is programmed to process and output a signal for driving the drawer block movement means, to form a path (one vertical and one horizontal aisle or a succession of horizontal and vertical stretches of aisle) which places the carriage in communication with the position to be reached. The drawers can also be moved vertically relative to each other (individually or in blocks) in order to dynamically create horizontal aisles (or parts of aisles) along which to move the lift carriage.

BRIEF DESCRIPTION OF THE DRAWINGS

Below is a description of a preferred embodiment of the invention, illustrated solely by way of non-limiting example in the accompanying drawings, in which:

FIGS. 2, 3 and 4 illustrate a drawer used in the storage system of FIG. 1, in a perspective view, in a front view and in a scaled-up detail from FIG. 3, respectively;

FIGS. 5 and 6 are both side views, with some parts cut away in order to better illustrate others, showing a movement unit forming part of the storage system of FIG. 1 in two different operating configurations of withdrawing a drawer;

FIG. 20 illustrates an unloading bay of the storage system in a side view partly in cross section.

DETAILED DESCRIPTION OF PREFERRED EMBODIMENTS OF THE INVENTION

Figure 1:
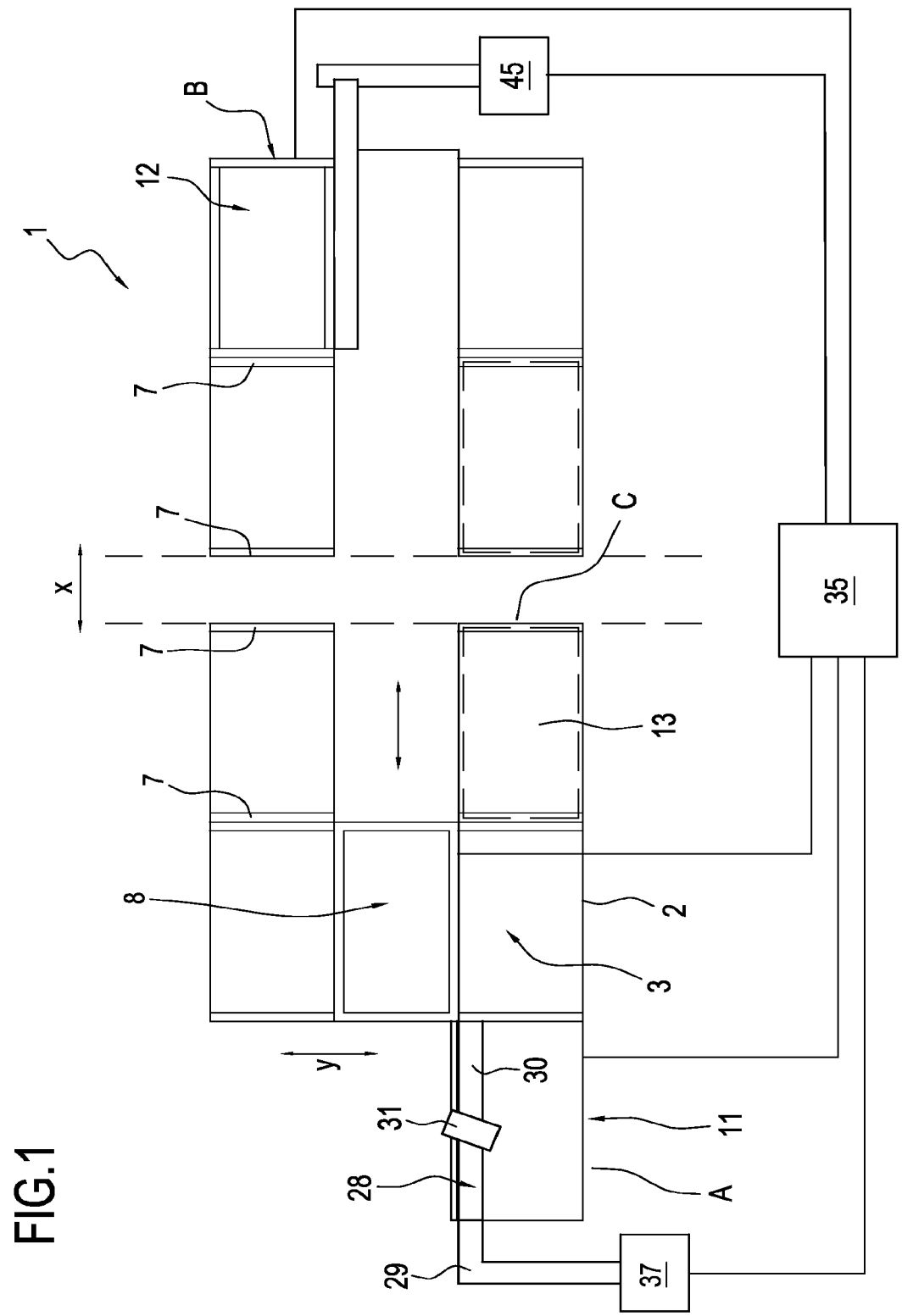
FIG. 1 is a schematic plan view of a storage system for storing plastic objects usable in bottling lines.

With reference to the accompanying drawings, in particular FIG. 1, the storage system 1 of the invention is used to distribute, store and handle loose objects 5.

The storage system 1 comprises a modular framework 2 extending along a longitudinal axis X, a transversal axis Y and a vertical axis Z to configure a plurality of compartments 3 substantially in the shape of parallelepipeds of the same size, for containing drawers 4 designed to contain the loose objects 5 in predetermined quantities.

The storage system 1 comprises a set of levels placed on top of one another and each of which comprises a plurality of compartments 3 positioned one after the other in horizontal succession.

Each compartment 3 is open at least on its large sides and is equipped with a bracket 7 at each head end for supporting a respective drawer 4 (at a height).

The storage system 1 is equipped with a unit 8 for handling and moving the drawers 4.

This unit comprises a stacker lift 8 equipped with a load-bearing frame 9 configured to move along the axis X of the storage system 1 in both directions and a lift 10 mounted on the frame 9 and movable in both directions along the axis Z of the storage system 1.

The lift 10 is configured to withdraw/place the drawers 4 from/into the compartments 3 and has a volumetric size such as to allow it to receive a drawer 4.

In the embodiment illustrated, the stacker lift 8 is positioned in the middle of the storage system 1 and divides two distinct sections of the storage system having levels of compartments 3 placed on top of each other.

It should be noted that the storage system 1 of the invention is used for distributing, storing and handling loose objects 5 of plastic material processed in bottling lines.

More specifically, the loose objects 5 to be distributed, handled and stored are parisons, caps or means for closing the bottles, or plastic containers, preferably intended for food products.

In light of this, the storage system 1 comprises a loading bay or station 11 for loading the loose objects 5 into the drawers 4.

Preferably, the stacker lift 8 conveys individual drawers 4 to and from the loading bay 11 for loading the objects 5 into the drawers 4.

Preferably, the loading bay 11 is located in the proximity of a head end of the storage system 1 (see FIG. 1).

In a first embodiment, (illustrated here), the loading bay 11 is located on the outside of the perimeter of the storage system 1.

Alternatively, the loading bay 11 might be located in a zone inside the storage system 1, preferably within a compartment 3.

It should be noted that the storage system 1 comprises an unloading bay or station 12 for unloading the loose objects 5 from the drawers 4.

In light of this, the stacker lift 8 conveys individual drawers 4 to and from the unloading bay 12 for unloading the objects from the drawers 4.

Preferably, the unloading bay 12 is located at one end of the storage system 1.

In light of this, the unloading bay 12 is located within the perimeter of the storage system 1 and occupies a volume equal to that of a compartment 3 of the storage system 1 so as to be accessible by the stacker lift 8.

More specifically, the unloading bay 12 is located at the head end of the storage system 1 opposite to that where the loading bay 11 is located.

Alternatively, the unloading bay 12 might be located at the same head end as the loading bay 11.

The storage system 1 also comprises a washing bay or station 13 for washing the drawers 4.

In light of this, the washing bay 13 is a station where each drawer 4 can be washed, dried and sanitized. The purpose of this is to meet standards of hygiene for storing the loose objects 5.

In light of this, the stacker lift 8 conveys individual empty drawers 4 to and from the washing bay 13 when required.

Preferably, the washing bay 13 is located within the perimeter of the storage system 1.

Also preferably, the washing bay 13 is located within the perimeter of the storage system 1 and occupies a volume equal to that of a compartment 3 of the storage system 1 so as to be accessible by the stacker lift 8.

The drawers 4 used for containing the objects 5 comprise a box-shaped structure comprising an open top and a closed bottom 14 with a profile in the shape of an upturned V or "humped back". Also, the bottom 14 is uniformly perforated (see FIGS. 2 to 4).

The box-shaped structure also comprises two lateral ends 15 provided with through holes distributed on each of the ends 15.

The shape of the bottom 14 and the uniformly distributed holes on the structure of the drawer 4, make the drawer quick and easy to wash and sanitize, besides allowing air to pass through when the drawer 4 is housed in the compartment 3 of the storage system 1.

It should be noted that each head end 15 is equipped with rolling elements 16 for its loading and unloading movement.

More specifically, the rolling elements 16 also allow the drawer to be supported in the compartment 3, on the lift 10 and in all the bays 11, 12 and 13 which serve the storage system 1.

Advantageously, the rolling elements 16 comprise a pair of wheels 17 which can turn idly and which are associated with the bottom of each head end 15.

In light of this and as mentioned previously, each compartment 3 is equipped with a bracket 7 which is located at each head end of the compartment 3 and which is engaged by the corresponding wheels 17 of the drawer 4 when the drawer 4 is placed or withdrawn.

Each bracket 7 (see FIG. 6) comprises a pair of indentations 18 on the surface of contact with the wheels 17 (and spaced from each other by a distance equal to the centre distance between two wheels 17) to allow the drawer 4 to be securely positioned in the compartment 3.

To this must be added the fact that each bracket 7 is equipped with a vertical pin 19 associated with the outer end thereof (the end not affected by the passage of the stacker lift 8) and if necessary acting as a limit stop for the drawer 4.

Preferably, the drawer 4 is equipped with a catch 20 protruding from the middle of each head end 15.

The two catches 20 (with U-shaped cross section) define the bilateral gripping elements by which the lift 10 holds the drawer 4 while the drawer 4 is being moved.

In light of this (see FIGS. 5 and 6), the lift 10 comprises a carriage 21 for containing the drawer 4 and whose volumetric size is such that it can receive the drawer 4 itself. The lift 10 comprises a telescopic unit 22 for gripping and releasing the drawer 4 for each head end of the carriage 21. Each unit 22 has a telescopic arm driven by suitable kinematic systems which allow it to move in both directions both along an axis parallel to the transversal axis Y of the storage system 1 (towards and away from the head ends 15 of the drawer 4) and along a vertical axis in order to do the following:

- extend the arms so as to move to a position above the catch 20 (horizontal movement with arms at a height where they can be freely extended);
- intercept and lock to both sides of the catch 20 with a fork-shaped hook 23 (vertical movement by which the arms are lowered to hooking and operating height) having a pair of wheels 24 for adapting to the outside surfaces of the catch 20;
- withdraw the arms in order to pick up the drawer 4 and place it in the carriage 21.

Releasing the drawer 4 in the compartment 3 or in the bays 11, 12, or 13 comprises the following steps:

- extending the arms outside the carriage 21 (at the hooking and operating height) to eject the drawer 4 from the carriage 21;
- lifting the arms to operating height;
- withdrawing the arms into the carriage 21.

Inside it, the carriage 21 is provided with a pair of guides 25 for supporting the drawer 4 where the wheels 17 of the drawer 4 rest as it moves in and out.

Preferably, under the guides 25 there are load cells (not illustrated) for measuring the weight of the drawer 4 when empty and of the drawer 4 when full.

Figure 7:
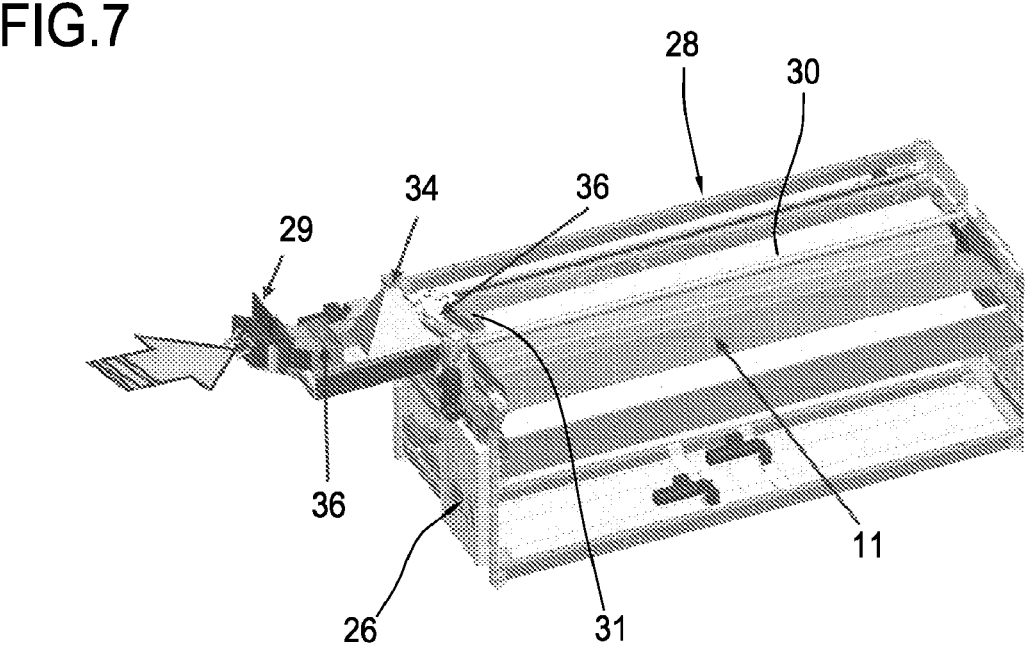
FIG. 7 illustrates a loading bay or station for loading the objects into the drawers of the storage system in a schematic perspective view from A in FIG. 1, with some parts cut away in order to better illustrate others.
Figure 8:
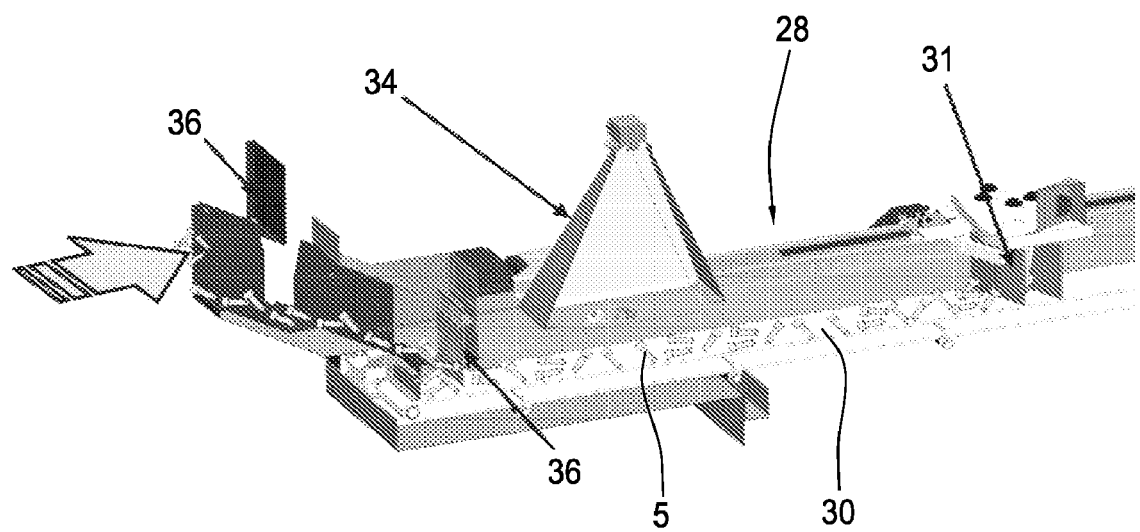
FIG. 8 is a scaled-up perspective view illustrating a detail of the loading bay of FIG. 7.
Figure 9:
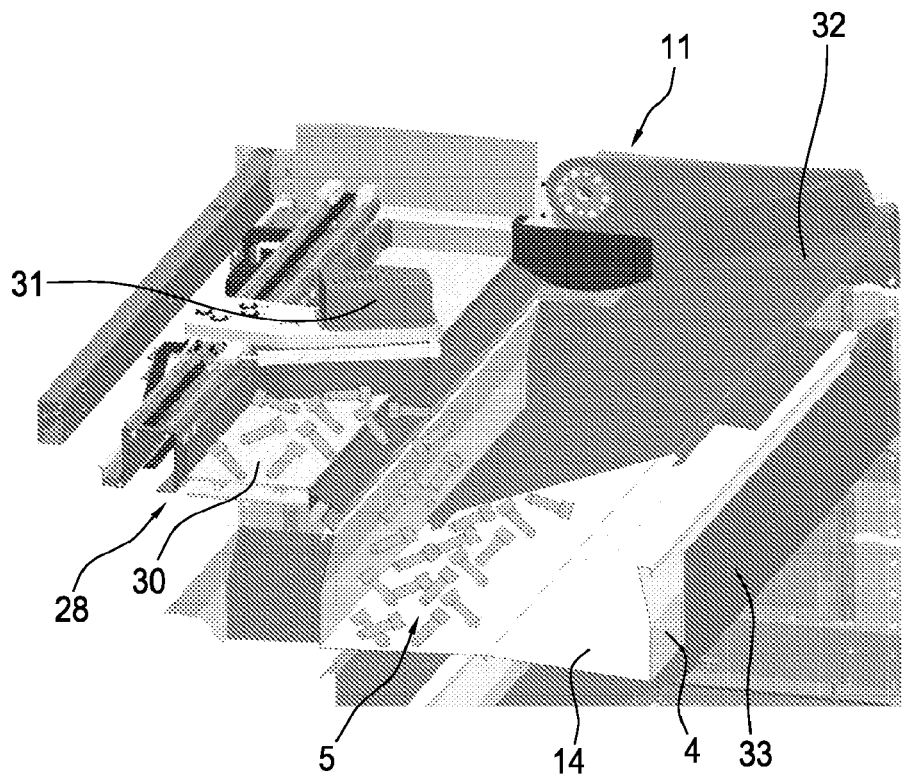
FIGS. 9 and 10 are both perspective views, with some parts cut away in order to better illustrate others, showing the loading bay in two different configurations of filling the drawers.
Figure 10:
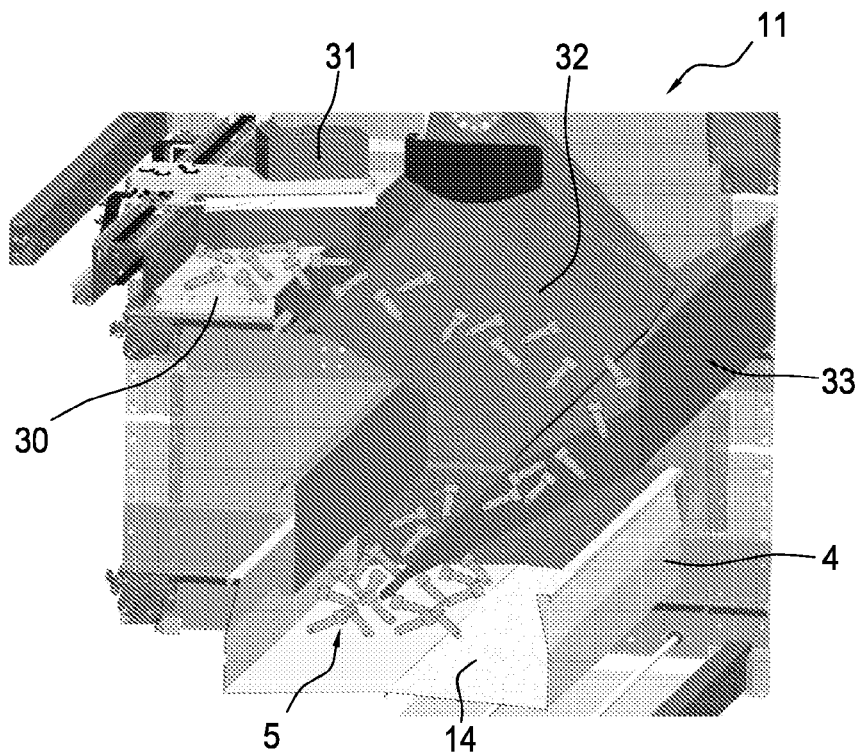

The loading bay 11 (see FIGS. 7 to 9) comprises a bottom frame 26 for housing at least two drawers 4 at different heights from the floor.

The drawers 4 are carried and picked up by the stacker lift 8 which can be positioned on one side of the frame 26.

The frame 26 has a series of guide pairs for supporting the drawers 4 (not visible here).

The frame 26 also has, for each working height of the drawers 4, a kinematic chain unit 27 located on both sides of the frame 26 and equipped with an inwardly protruding pin for engaging the corresponding catch 20 of each head end 15 of the drawer 4.

Figure 19:
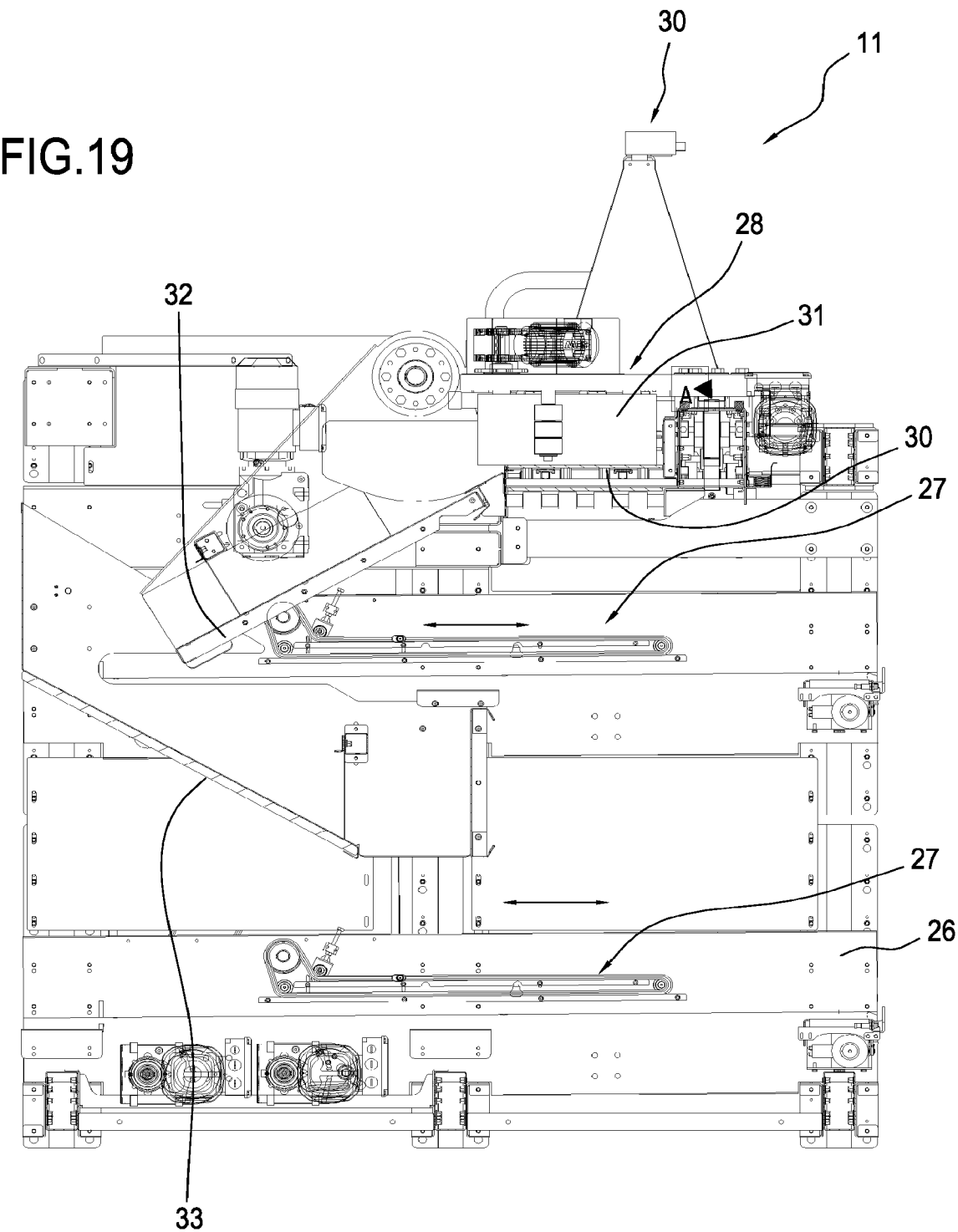
FIG. 19 illustrates a loading bay of the storage system in a side view partly in cross section.

The kinematic unit 27 (see FIG. 19) allows the drawer 4 to be moved in both directions along an axis parallel to the transversal axis Y of the storage system.

The loading bay 11 comprises means 28 for controlled feeding of incoming loose objects 5 from a conveyor 29.

Preferably, these feed means 28 place the loose objects 5 into the drawer 4 continuously and in proportion to the loose objects 5 being fed in by the conveyor 29.

Alternatively, the feed means 28 place the loose objects 5 into the drawer 4 according to a logic whereby the loose objects 5 are accumulated and released into the drawer 4 later.

The feed means 28 comprise (FIGS. 7 to 10) a first belt 30 extending parallel to the axis of longitudinal extension of the drawer 4 (that is, parallel to the axis X of the storage system 1) and above the drawers 4. Sliding in both directions along this first belt 30 there is a scraper or belt diverter 31 positioned transversely to the first belt 30 to intercept and direct the falling objects 5 towards the drawer 4.

The diverter 31 is driven according to a loading program logic illustrated in FIG. 17 (described below).

The loading bay 11 comprises a first, upper chute 32 and a second chute 33 to load the drawers 4 located at a lower level.

Figure 11:
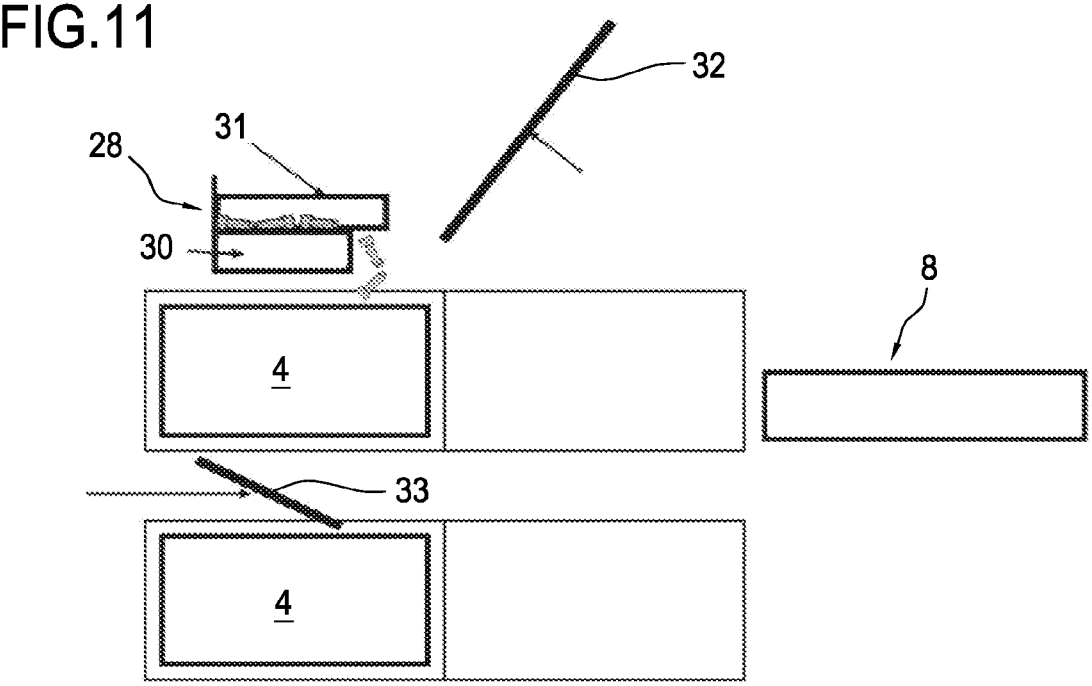
FIGS. 11 and 12 illustrate the unloading bay in schematic side views in two different configurations of feeding the objects.

In other words, when a drawer 4 at an upper level is full (configuration of FIG. 11), the drawer 4 is moved translationally by the kinematic unit 27 towards the infeed/outfeed zone of the loading bay 11 (FIG. 12) where the stacker lift 8 is waiting.

Figure 12:
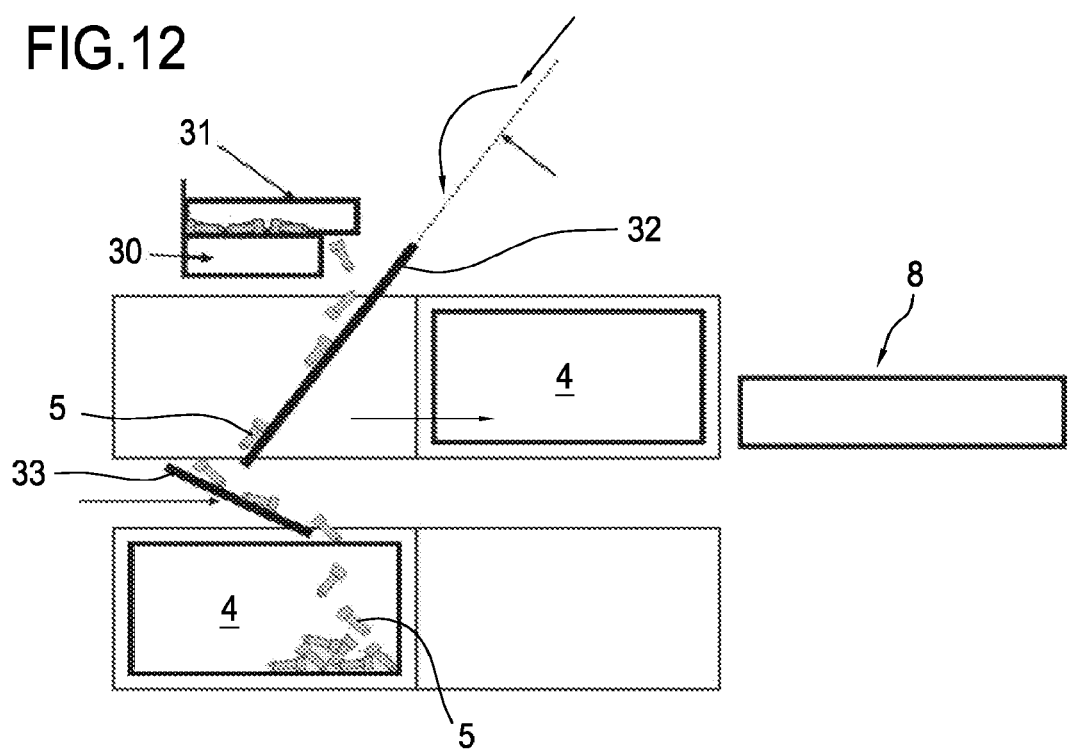
Figure 13:
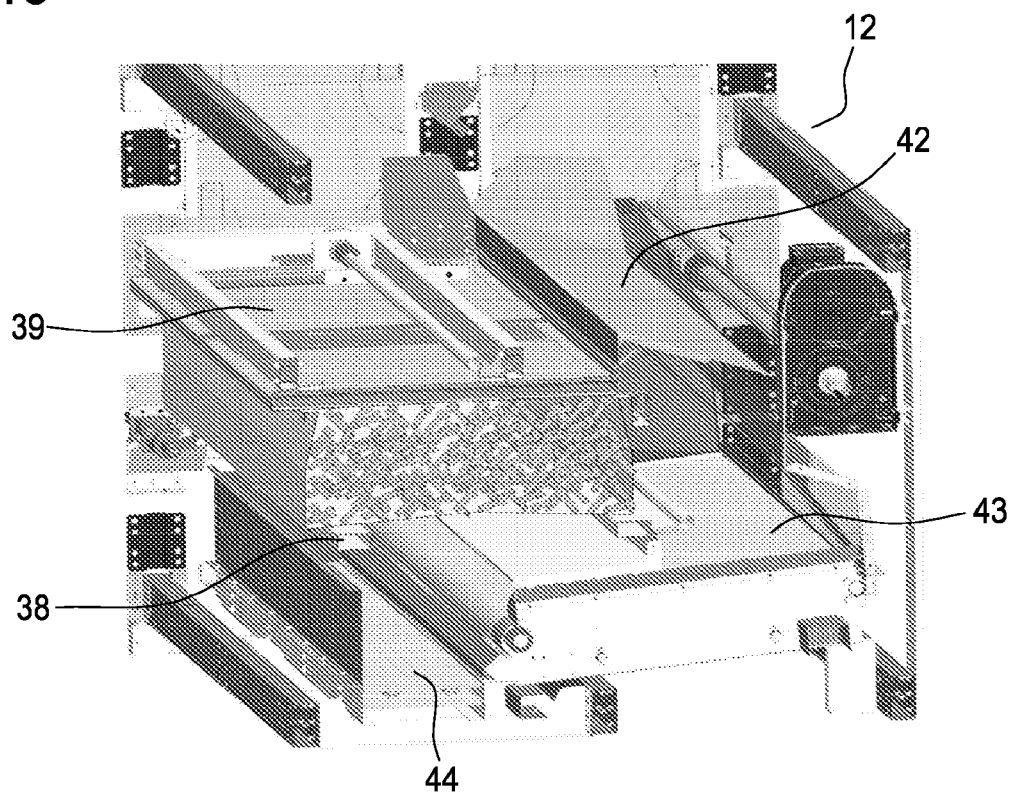
FIGS. 13, 14 and 15 illustrate an unloading bay or station for unloading the loose plastic objects from a drawer to a movement belt in three different operating configurations; all these figures being perspective views from B in FIG. 1 and with some parts cut away in order to better illustrate others.
Figure 14:
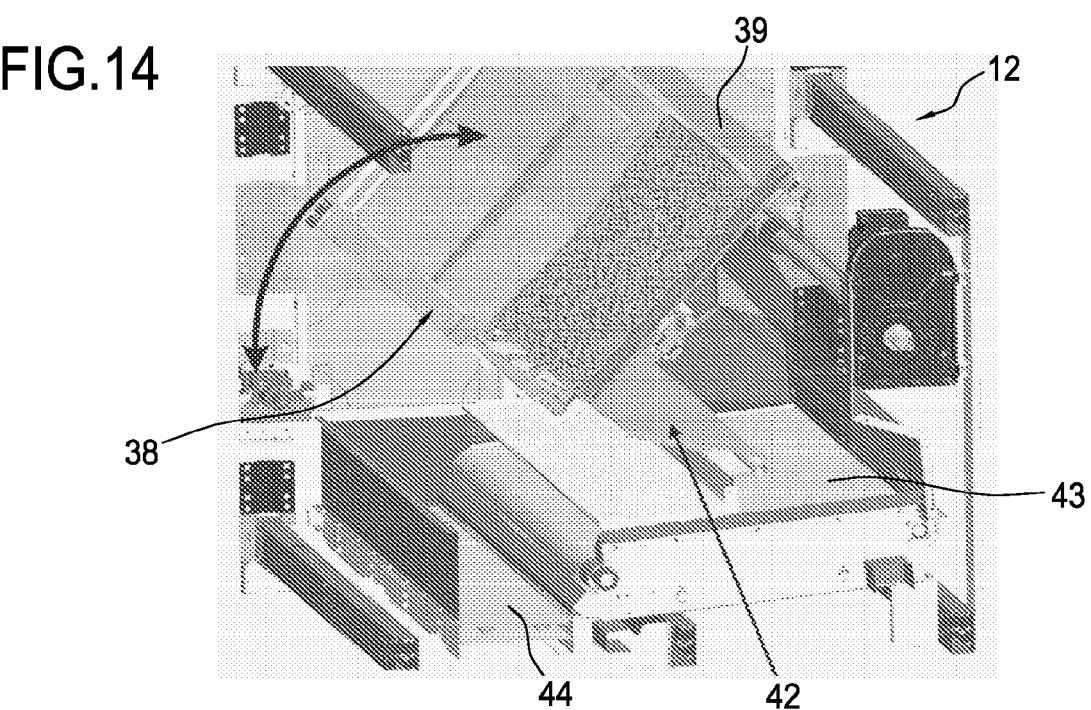
Figure 15:
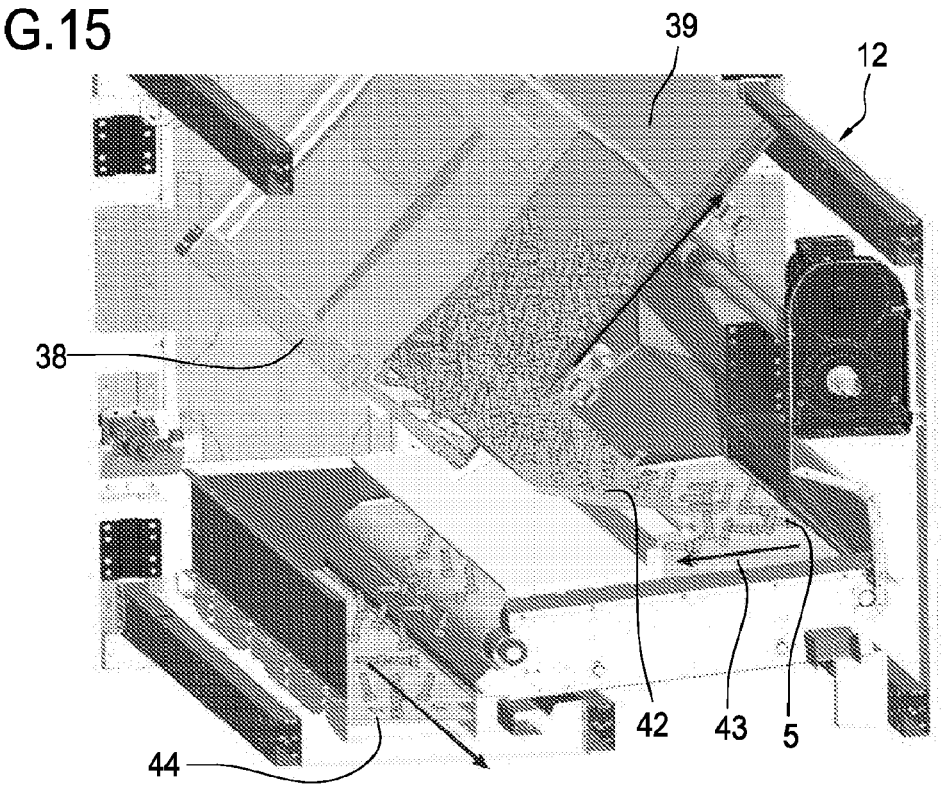
Figure 16:
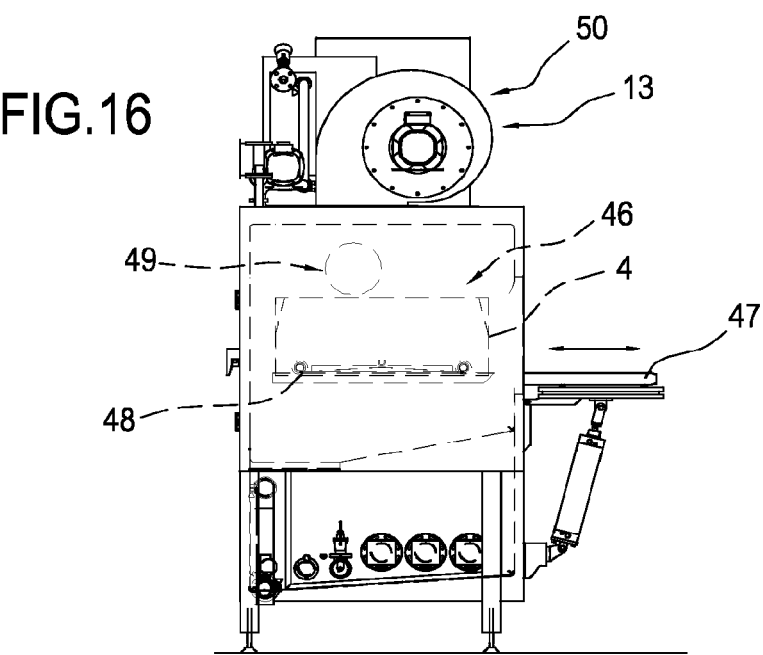
FIG. 16 is a side view from C in FIG. 1, illustrating a washing bay or station forming part of the storage system of FIG. 1.

At this point, the first chute 32 (by roto translating) moves down a level to intercept the falling objects 5 and direct them towards the second chute 33 which in turn directs the loose objects 5 into the lowermost drawer 4 (FIG. 12).

The second chute 33, too, can be moved along a transversal direction to modify the path of the loose objects 5 as they fall.

Alternatively (not illustrated), to load the drawers 4 by accumulation, the belt 30 might prepare a predetermined quantity of loose objects 5 which are picked up from a container which is movable also vertically so that the accumulated quantity of objects 5 is moved closer to the drawer 4 and the objects 5 thus fall from a smaller height.

The storage system 1 also comprises, between the conveyor 29 of objects 5 and the first belt 30, a counting unit 34 for counting the objects fed to the first belt 30.

The counting unit 34 is mounted above the zone where the objects 5 pass. The counting unit 34 is connected to a central control unit 35 of the storage system 1 and of the respective bays 11, 12 and 13.

The storage system 1 also comprises a unit 36 for treating the incoming objects and positioned, between the conveyor 29 and the first belt 30.

The unit 36 may comprise an anti-static bar.

The unit 36 may comprise a lamp for emitting UV rays.

The unit 36 may comprise nozzles for spraying sterilizing liquids (preferably, but not necessarily, volatile).

The unit 36 may comprise ionizing devices (to prevent external substances from being "attracted" electrostatically).

The conveyor 29 may be fed by a machine 37 which makes the loose objects 5.

As regards the logic by which the drawer 4 is loaded by the loading bay 11, a preferred embodiment (see FIG. 17) comprises dividing the top surface area of the drawer 4 into smaller cells approximately arranged along two axes (a longitudinal axis X4 and a transversal axis Y4 of the drawer 4) and which receives a predetermined quantity of objects 5.

The number of cells and layers of objects to be placed in order to fill the drawer 4 is decided as a function of the type and individual size of the object 5.

In the case described earlier on, the diverter 31 is located at a predetermined initial position and waits for the incoming objects 5 to arrive after being counted by the unit 34 upstream of the first belt 29.

Contact of the incoming objects 5 which have been counted with the diverter 31 causes the objects to be placed in the predetermined cell.

When the predetermined number of objects 5 for filling the cell is reached (a number greater than that predetermined for filling the cell having been counted upstream), the drawer 4 and the diverter 31 are moved in such a way as to put another cell of the drawer 4 in the loading position.

Figure 17:
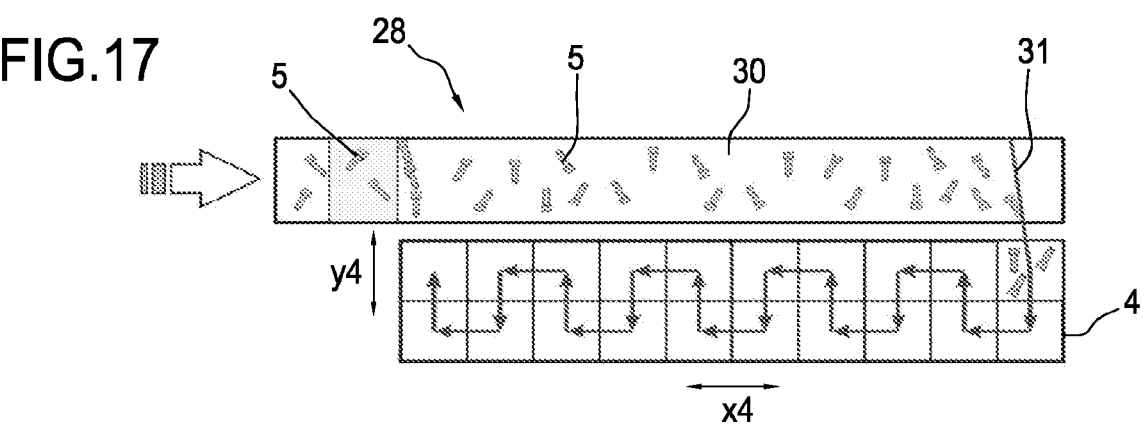
FIG. 17 is a schematic top plan view showing a loading scheme for a drawer in the loading bay of the storage system of the invention.

The drawer 4 is moved by the kinematic unit 27 to change the position along the axis Y4, whereas the diverter 31 is moved to change the position along the axis X4 (see FIG. 17).

The speed of movement of the components, in particular that of the diverter 31 (as well as the speed of its belt) is correlated as a function of the position of the diverter 31 relative to the zone where the objects 5 enter and the operating speed of the first belt 30.

This procedure is repeated for each cell present in the drawer 4 and, if the program involves filling the cell with two or more layers, the procedure is repeated until the drawer 4 is completely full according, for example, to the path shown by the arrows in FIG. 17.

The unloading bay 12 occupies a space substantially equivalent to one or more compartments 3 of the storage system 1.

The stacker lift 8 can feed or withdraw a drawer 4 from the unloading bay 12 from the side of the unloading bay 12 itself, in the same way as described above for the compartments 3 and the loading bay 11.

The unloading bay 12 comprises:
- a frame 38 for supporting the drawer 4 and also having an upper panel 39 for closing the top of the drawer 4 and movable translationally in both directions;
- means 40 for locking the drawer 4 in the frame 38;
- means 41 for rotating the drawer 4 about an axis parallel to the longitudinal axis X of the storage system 1 for unloading the loose objects 5;
- a guide chute 42 which directs the loose objects 5 as they fall and whose angle of inclination is adjustable;
- a bottom conveyor 43 which receives and moves the loose objects 5 as they fall onto it and which is movable along a direction parallel to the transversal axis Y of the storage system 1. Preferably, the operating section of the bottom conveyor 43 is inclined downwardly (that is, towards the floor).

Preferably, the bottom collecting and movement conveyor 43 takes the loose objects 5 to a further, removing conveyor belt 44 which conveys the objects 5 from the storage system 1 to a production line 45 (for example, a bottling line).

The unloading bay 12 thus receives the full drawer 4 and unloads it by rotating the drawer 4 in such a way as to cause progressive opening of the panel 39, correlated with the angle of inclination of the drawer 4.

As the opening allowed by the panel 39 increases in size, so the chute 42 is positioned accordingly and adapts its inclination to the inclination of the drawer 4 so that the objects 5 always fall from the same height, irrespective of the angular position of the drawer 4.

After being unloaded, the drawer 4 is returned to the horizontal position and released by the locking means 40 so that it can be withdrawn by the stacker lift 8.

The washing bay 13 is preferably located inside the storage system 1 and occupies a space equal to that of a compartment 3.

The washing bay 13 comprises:
- a sealed chamber 46 having a door 47 to allow the drawer 4 to pass through;
- slideways 48 for receiving the drawer 4 to be sanitized and located inside the chamber 46;
- internal washing and/or sanitizing means 49;
- internal drying means 50.

The drawer 4 is placed and withdrawn by the stacker lift 8 in the same way as described above for the compartments 3 and the other bays.

It should be noted, therefore, that the drawer 4 remains inside the storage system 1 during the washing operations carried out on it.

All the units of the storage system 1 described to here are slave units of the aforementioned central control unit 35.

The central unit 35 has memory banks correlated with the number of drawers 4, their weight when empty, and the number of compartments 3 in the storage system (possibly correlated with the position of a predetermined drawer 4).

The operating program of the storage system 1 is set on the central unit 35 by pointing to the type of loose object 5 to be handled.

Depending on the loose object 5 selected, the central unit 35 self adapts based on the program and database, by which it drives:
- feeding of the loose objects 5 to the loading bay 11;
- type, speed and mode of loading the drawers 4;
- positioning of the drawers 4 inside the compartments 3 of the storage system;
- withdrawal of the drawers 4 to be unloaded in the unloading bay 12.

Station drive is accomplished, preferably, with parameters such as the following:
- speed of the conveyor belts (for the loading and unloading bays) as a function of the object to be loaded/unloaded;
- number of cell sections in X4 and Y4 and loading logic or filling matrix;
- data regarding product batches to be made and which batches to be loaded/unloaded at the bays and thus, which drawers to direct to the unloading bay also as a function of the production of the machine which makes the objects upstream of the storage system.

It should be noted, therefore, that the master drive logic of the unit 35 is correlated with request parameters from the production (bottling) line 45. Based on these parameters, the unit 35 decides which drawers 4 are to be sent to the unloading bay 12.

As mentioned above, the unit 35 drives the stacker lift 8 which sends the data regarding the weight of the drawers 4 being handled (when empty and when full) and their reference to be checked against the database of the unit 35: the purpose of this is also to check that the drawers 4 are completely loaded and unloaded (again as a function of the type of object 5 being handled).

Thanks to the system described to here, the unit 35 can rapidly identify and manage (in the feed block) batches of objects which are found to be defective, including those which have been stored.

Besides identification, the unit 35 can also manage procedures of removal of said batches of objects using the stacker lift and the unloading bay 12 during operations on the storage system without affecting the work cycle of the production line.

Figure 18:
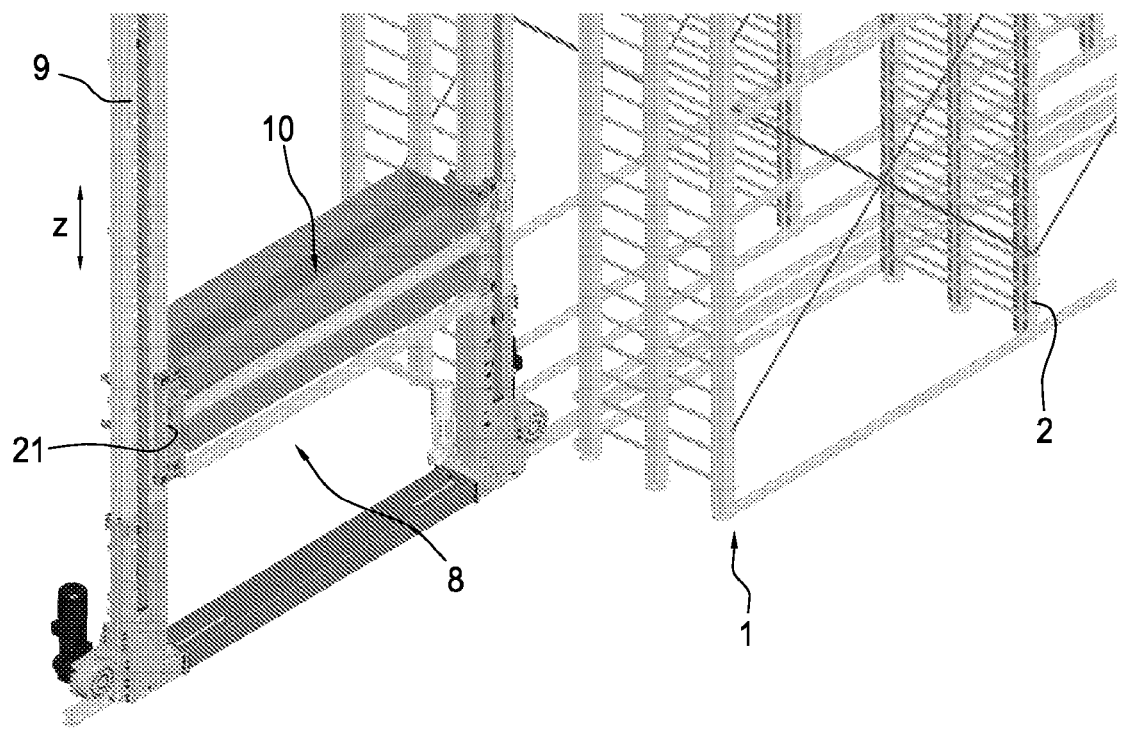
FIG. 18 illustrates a detail of the storage system of FIG. 1, showing the stacker lift coming out of one head end of the storage system in a perspective view, with some parts cut away in order to better illustrate others.

The unit 35 is also programmed to optimize operations of handling the drawers 4 in a "double depth" storage system 1, that is, with levels having double compartments 3, placed side by side (see schematic representation in FIG. 18).

In this case, the unit 35 is programmed to drive the stacker lift 8 to "optimize" the positioning of the drawers 4 inside the compartments 3, avoiding having to move drawers 4 in order to withdraw drawers 4 from the compartment 3 furthest from the stacker lift 8.

It should also be noted that the unit 35 also controls washing and sanitizing times according to the length of time the drawers 4 have been used.

The structure of the storage system thus obtained allows loose objects to be handled from production to use (bottling) rapidly and effectively, keeping the object under strict check after its production and before it is sent to the line where it is used.

The stations used are configured to handle the objects with great care, guaranteeing they are not damaged and providing a high standard of hygiene inside the storage system.

The storage system structured in this way is fully automatic from product loading to product unloading without having to remove or add containers from outside the structure.

The special structure of the drawers, which are moved at all times by rolling parts, guarantees a high standard of hygiene in all parts of the storage system.

The drawer is designed to be rapidly sanitized without external intervention.

As stated, therefore, the storage system has for a supervisor the system which serves the production line downstream (bottling).

The invention claimed is:

1. A storage system for storing objects of plastic material processed in a bottling line, comprising:
   a plurality of drawers configured to contain groups of the objects;
   a frame which defines a plurality of compartments configured to house the drawers;
   a stacker lift movable in the storage system itself and configured to access the compartments in such a way as to withdraw and place drawers from and into the compartments;
   a loading bay having one or more loading compartments for receiving corresponding drawers and having a loading manipulator configured to place in the drawers the loose objects received from an infeed conveyor;
   an unloading bay having at least one unloading compartment for receiving a corresponding drawer and having an unloading manipulator configured to place onto an outfeed conveyor the loose objects stored in the drawer;
   a control unit, set up to receive a drive signal representing an operation of the bottling line and connected to the stacker lift, to the loading manipulator and the unloading manipulator, to automatically control movements of the stacker lift, of the loading manipulator and of the unloading manipulator as a function of the drive signal.

2. The storage system according to claim 1, comprising:
   one or more sensors, configured to count and/or weigh the objects contained in the drawers, wherein the
   control unit is configured to control movements of the stacker lift, of the loading manipulator and of the unloading manipulator further as a function of data collected by the one or more sensors.

3. The storage system according to claim 1, wherein the control unit comprises a memory, the memory containing a database, and is programmed to automatically store in the database information regarding content of the drawers, in relation to the compartment in which each drawer is positioned.

4. The storage system according to claim 1, wherein the control unit is programmed to drive the conveyor based on a FIFO method of storing and retrieving the objects.

5. The storage system according to claim 1, wherein the control unit comprises a memory containing a database, and wherein the control unit includes a user interface and is configured for displaying a plurality of values for a parameter, the parameter representing types of objects contained in the storage system, and wherein the control unit is programmed to set control codes representing a sequence of actions for the loading bay and/or for the unloading bay, as a function of a value selected by a user through the user interface, from the plurality of values displayed by the control unit.

6. The storage system according to claim 1, comprising a drawer washing bay located in one or more compartments and accessible by the stacker lift, wherein the control unit is programmed to control the conveyor and the washing bay to wash all the drawers at predetermined time intervals.

7. The storage system according to claim 1, comprising units for treating the objects, comprising UV lamps and/or antistatic bars and/or ionizing devices, and configured to sterilize the objects in the storage system and/or prevent external substances from being electrostatically attracted to them.

8. The storage system according to claim 1, wherein the stacker lift includes:
   a movable frame, which is slidably coupled to the storage system frame to translate along a longitudinal direction parallel to the floor within an aisle without compartments inside the storage system;
   a lift, which is movable vertically relative to its movable frame and movable independently of, and simultaneously with, the longitudinal translational movement of the selfsame movable frame.

9. The storage system according to claim 1, comprising a pressurization system for generating a flow of air through the drawers, so as to keep the compartments under conditions of overpressure.

10. A bottling line for containers of thermoplastic material, comprising:
    a moulding unit, for making parisons of thermoplastic material from the thermoplastic material in its raw form;
    at least one blow-moulding unit, configured to receive the parisons and to blow-mould them in such a way as to make containers designed to be filled;
    a parison thermal conditioning structure, configured to receive the parisons from the moulding unit and to heat and cool the parisons;
    an automatic storage system, configured to contain the parisons and connected to the thermal conditioning structure to receive and feed parisons from and to the thermal conditioning structure,
    the storage system further including:
    a plurality of drawers configured to contain groups of the objects,
    a frame which defines a plurality of compartments configured to house the drawers;
    a stacker lift movable in the storage system itself and configured to access the compartments in such a way as to withdraw and place drawers from and into the compartments;
    a loading bay having one or more loading compartments for receiving corresponding drawers and having a loading manipulator configured to place in the drawers the loose objects received from an infeed conveyor;
    an unloading bay having at least one unloading compartment for receiving a corresponding drawer and having an unloading manipulator configured to place onto an outfeed conveyor the loose objects stored in the drawer;
    a control unit, having access to a database.

11. The line according to claim 10, comprising:
    an infeed conveyor, connected to the loading bay of the storage system and configured to feed the loading bay with loose products;
    a outfeed conveyor, (13, 11) connected to the unloading bay of the storage system and configured to feed loose products out of the storage system.

12. The storage system according to claim 1, wherein the control unit includes a database containing information about the number of drawers, their weight when empty, and the number of compartments in the storage system.

13. A storage system for storing objects of plastic material processed in a bottling line, comprising:
    a plurality of drawers configured to contain groups of the objects;
    a frame which defines a plurality of compartments configured to house the drawers;
    a stacker lift movable in the storage system itself and configured to access the compartments in such a way as to withdraw and place drawers from and into the compartments;
    a loading bay having one or more loading compartments for receiving corresponding drawers and having a loading manipulator configured to place in the drawers the loose objects received from an infeed conveyor;
    an unloading bay having at least one unloading compartment for receiving a corresponding drawer and having an unloading manipulator configured to place onto an outfeed conveyor the loose objects stored in the drawer;
    a control unit, having access to a database;
    an operating program, set on the control unit according to a typology of the loose objects to be handled, wherein, depending on a selected typology for the the loose objects, the control unit self-adapts according to the operating program and according to information contained in the database.

14. The storage system according to claim 13, wherein the control unit is configured to drive one or more of the following operations:
    feeding of the loose objects to the loading bay;
    typology and speed of loading the drawers;
    positioning of the drawers inside the compartments of the storage system;
    withdrawal of the drawers to be unloaded in the unloading bay.

15. The storage system according to claim 14, wherein the control unit is programmed to provide said operations driving, resorting to one or more of the following parameters:
    speed of conveyor belts as a function of the object to be loaded or unloaded;
    number of cell sections and loading logic or filling matrix;
    data regarding product batches to be made and which batches to be loaded or unloaded at the loading bay or unloading bay.

16. The storage system according to claim 13, wherein the control unit is configured to drive the stacker lift, wherein the stacker lift sends to the control unit data regarding weight of the drawers being handled and regarding a reference to be checked against the database, for checking that the drawers are completely loaded and unloaded, as a function of a typology of object being handled.

17. The storage system according to claim 13, wherein the control unit is configured to control washing and sanitizing times according to a length of time the drawers have been used.

18. The line according to claim 10, wherein the control unit is configured to drive one or more of the following operations:
  feeding of the loose objects to the loading bay;
  typology and speed of loading the drawers;
  positioning of the drawers inside the compartments of the storage system;
  withdrawal of the drawers to be unloaded in the unloading bay,
wherein the control unit is programmed to provide said operations driving, resorting to one or more of the following parameters:
  speed of conveyor belts as a function of the object to be loaded or unloaded;
  number of cell sections and loading logic or filling matrix;
  data regarding product batches to be made and which batches to be loaded or unloaded at the loading bay or unloading bay and thus
  information about which drawers to direct to the unloading bay as a function of the production of the moulding unit which makes the objects upstream of the storage system.

19. The line according to claim 10, wherein the control unit is programmed to process request parameters from the bottling line, and wherein the control unit decides, based on the request parameters, which drawers are to be sent to the unloading bay.

* * * * *

UNITED STATES PATENT AND TRADEMARK OFFICE
CERTIFICATE OF CORRECTION

PATENT NO. : 10,822,218 B2
APPLICATION NO. : 16/219113
DATED : November 3, 2020
INVENTOR(S) : Daniele Marastoni Page 1 of 1

It is certified that error appears in the above-identified patent and that said Letters Patent is hereby corrected as shown below:

In the Claims

In Column 16, Line 14, being Line 5 of Claim 11, please delete:
"(13, 11)"

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*